(12) United States Patent
Majid

(10) Patent No.: US 10,129,584 B2
(45) Date of Patent: *Nov. 13, 2018

(54) DISPLAY COMPONENT ACTIVATION

(71) Applicant: BBY SOLUTIONS, INC., Richfield, MN (US)

(72) Inventor: Mahmood Majid, Lakeville, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/905,515

(22) Filed: Feb. 26, 2018

(65) Prior Publication Data

US 2018/0192113 A1 Jul. 5, 2018

Related U.S. Application Data

(63) Continuation of application No. 14/727,345, filed on Jun. 1, 2015, now Pat. No. 9,930,394.

(51) Int. Cl.
*H04N 21/426* (2011.01)
*H04N 21/438* (2011.01)
*H04N 21/2543* (2011.01)

(52) U.S. Cl.
CPC ..... *H04N 21/4263* (2013.01); *H04N 21/2543* (2013.01); *H04N 21/42623* (2013.01); *H04N 21/4382* (2013.01); *H04N 21/4383* (2013.01)

(58) Field of Classification Search
CPC .......... H04N 21/4263; H04N 21/2541; H04N 21/25816; H04N 21/4382; H04N 21/4627;

(Continued)

(56) References Cited

U.S. PATENT DOCUMENTS 4,847,840 A * 7/1989 Jinguji ............... G11B 20/1833
375/E7.279
7,113,230 B1 * 9/2006 Genovese ............ H04N 5/4401
348/731

(Continued)

FOREIGN PATENT DOCUMENTS

WO WO-2012064393 A2 5/2012

OTHER PUBLICATIONS

"U.S. Appl. No. 14/727,345, Advisory Action dated Jan. 26, 2017", 5 pgs.

(Continued)

*Primary Examiner* — Hai V Tran
(74) *Attorney, Agent, or Firm* — Schwegman Lundberg & Woessner, P.A.

(57) ABSTRACT

A device configuration for determining whether to send an activation notification based on whether a signal can be decoded by a tuner or codec are described herein. For example, a device may include a tuner, activated in response to receiving the user indication, to attempt to decode a signal corresponding to a channel, and a processor to execute instructions that: detect, prior to a start of a delay period, that the tuner is required to decode the signal, determine, during the delay period, whether the signal can be decoded by the tuner, deactivate the tuner after the delay period without sending a tuner activation notification, in response to a determination that the signal cannot be decoded by the tuner, and send the tuner activation notification to a remote server after the delay period, in response to a determination that the signal can be decoded by the tuner.

21 Claims, 6 Drawing Sheets

(58) Field of Classification Search
CPC .. H04N 5/50; H04N 1/00098; H04N 21/2543; H04N 21/4345; H04N 21/482; H04N 5/44; H04N 5/4401; G06F 21/10; G01Q 30/0251
See application file for complete search history.

(56) References Cited

U.S. PATENT DOCUMENTS

| | | | |
|---|---|---|---|
| 7,849,018 B1 * | 12/2010 | Warner | G06F 21/10 380/200 |
| 2002/0066103 A1 | 5/2002 | Gagnon et al. | |
| 2002/0144116 A1 | 10/2002 | Giobbi | |
| 2004/0106454 A1 | 6/2004 | Walker et al. | |
| 2005/0044577 A1 | 2/2005 | Jerding | |
| 2005/0243217 A1 * | 11/2005 | Yun | H03D 3/008 348/725 |
| 2006/0203129 A1 * | 9/2006 | Takagi | H04N 5/4401 348/731 |
| 2009/0286565 A1 * | 11/2009 | Liu | H04L 5/0044 455/522 |
| 2010/0218181 A1 | 8/2010 | Seiden | |
| 2011/0166968 A1 * | 7/2011 | Houng | H04N 5/44 705/30 |
| 2012/0120315 A1 | 5/2012 | Shintani | |
| 2012/0120323 A1 | 5/2012 | Shintani et al. | |
| 2012/0123885 A1 | 5/2012 | Shintani et al. | |
| 2012/0123916 A1 | 5/2012 | Shintani et al. | |
| 2012/0124678 A1 | 5/2012 | Shintani et al. | |
| 2016/0353151 A1 | 12/2016 | Majid | |

OTHER PUBLICATIONS

"U.S. Appl. No. 14/727,345, Examiner Interview Summary dated Aug. 26, 2016", 3 pgs.

"U.S. Appl. No. 14/727,345, Final Office Action dated Nov. 4, 2016", 17 pgs.

"U.S. Appl. No. 14/727,345, Non Final Office Action dated Jun. 16, 2017", 18 pgs.

"U.S. Appl. No. 14/727,345, Notice of Allowance dated Nov. 24, 2017", 13 pgs.

"U.S. Appl. No. 14/727,345, Notice of Allowance dated Nov. 25, 2017", 13 pgs.

"U.S. Appl. No. 14/727,345, Response filed Jan. 4, 2017 to Final Office Action dated Nov. 4, 2011", 13 pgs.

"U.S. Appl. No. 14/727,345, Response filed Feb. 6, 2017 to Advisory Action dated Jan. 26, 2017", 14 pgs.

"U.S. Appl. No. 14/727,345, Response filed Aug. 22, 2016 to Non Final Office Action dated May 20, 2016", 11 pgs.

"U.S. Appl. No. 14/727,345, Response filed Sep. 18, 2017 to Non Final Office Action dated Jun. 16, 2017", 14 pgs.

"U.S. Appl. No. 14/727,345, Non Final Office Action dated May 20, 2016", 13 pgs.

* cited by examiner

DISPLAY COMPONENT ACTIVATION

CROSS-REFERENCE TO RELATED APPLICATIONS

The present application is a continuation of U.S. patent application Ser. No. 14/727,345, filed Jun. 1, 2015, which application is hereby incorporated by reference in its entirety.

TECHNICAL FIELD

Embodiments pertain to digital signal tuners and other display components used in display devices. Some embodiments relate to consumer electronic display devices, such as televisions, monitors, and the like.

BACKGROUND

Electronic display devices such as televisions, monitors, video receivers, and projectors often contain television tuners for receipt and processing of digital terrestrial, cable, or satellite television signals, and codecs for decoding streaming video or video media. Increasingly, consumers are using electronic display devices to access video content without using a television tuner or certain codecs. The costs that are required to operate the functions of certain tuners, codecs, and other components on electronic display devices, thus, is undesirable for both manufacturers and consumers when many consumers choose not to use the components.

Existing techniques have not properly prevented activation of a tuner when not in use. For example, Shintani et al., Activating Licensable Component Provided by Third Party to Audio Video Device, U.S. Pat. No. 8,544,111, describes detecting an auto-scan for TV channels, sending a tuner activation request in response to the auto-scan, and activating a tuner after receiving an activation code in response to the tuner activation request. However, this does not prevent tuner activation when the auto-scan fails, and it does not deactivate the tuner to save power.

DETAILED DESCRIPTION

Figure 1:
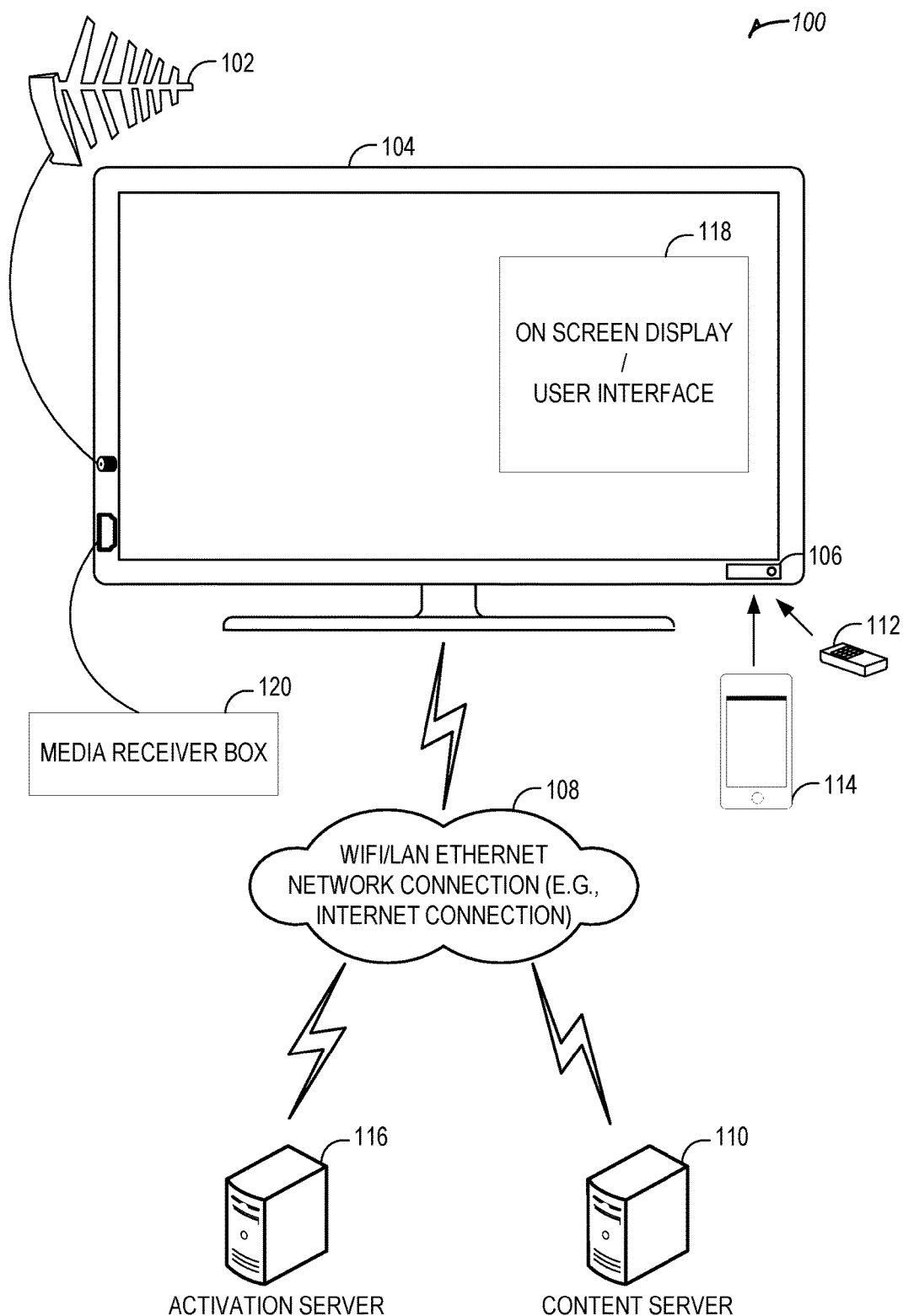
FIG. 1 illustrates a system for decoding signals by a tuner or codec and sending an activation notification in connection with an example further described herein.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Traditionally, in the United States, television broadcasts were performed using an analog National Television System Committee (NTSC) signal. In 2009, standards throughout North America were changed to require widespread use of an Advanced Television Systems Committee (ATSC) digital terrestrial television signal, also known as an over-the-air (OTA) digital television (DTV) signal. Other countries use other digital signal standards to broadcast digital terrestrial television signals, such as the Digital Video Broadcasting-Terrestrial (DVB-T) standard used throughout Europe and most of Asia, the Integrated Services Digital Broadcasting-Terrestrial (ISDB-T) standard used in most of South America, and the Digital Terrestrial Multimedia Broadcast (DTMB) standard used in China Cable television in North America is typically broadcast using a quadrature amplitude modulation (QAM) format signal. Each of these examples of digital television signals may be used with a tuner that processes and decodes the signals, provided that the tuner is configured to interpret the type of signal received. A tuner can be configured to decode one or more of the above standards and if configured to decode more than one, can have a controller to determine which standard is used.

With existing display devices such as televisions and monitors, a tuner is either built in to the device an external tuner device is used. An internal or built in tuner can be found in many televisions. An external tuner can be used with monitors or televisions (even if the television also has an internal tuner). An internal or external tuner can be interchangeable. An external tuner can be included with an antenna. In an example, a tuner can be included in a media receiver box, such as cable box, digital video recorder (DVR), satellite box, or the like. In another example, an external tuner can include a digital tuner box (i.e., a stand-alone tuner), such as the tuner described in U.S. patent application Ser. No. 14/519,968, titled "Television Tuner Device for Processing Digital Audiovisual Content," filed on Oct. 21, 2014 which is hereby incorporated by reference herein in its entirety.

There is often a cost added to the sale of the tuner device in electronic display devices that is unnecessary if a consumer does not ever use the tuner device. For example, using a tuner may require paying license fees to obtain rights to the patents that cover the sale, configuration, or use of the tuner device. Similarly, decoding video formats using codecs may require the payment of license fees to obtain rights to patents that cover the sale, configuration, or use of the codecs, or a license to distribute or use the copyrighted software code that provides a specific implementation of the codecs. Other licensing fees may be required for displaying, using, configuring, or processing outputs of tuners or codecs within certain configurations of a display device.

FIG. 1 illustrates a system 100 for decoding signals by a tuner or codec and sending an activation notification. The system 100 includes a display 104, such as a television or monitor, that can include an external tuner or an internal tuner. In an example, the display device 104 includes an internal tuner and is connected to an antenna 102. The antenna 102 can receive an ATSC digital terrestrial television signal. In an example, the display device 104 can include user input receiver 106, such as a processor connected to process information from an infrared (IR) receiver, an audio or voice receiver, a Wi-Fi (e.g., IEEE 802.11 standard-compliant) receiver, touchscreen, or other type of receiver for receiving input from a remote 112, mobile device 114, or other device (e.g., a computer, tablet, etc.). In other examples, the user input may be provided by a voice command, touch command, and like commands that are controlled or initiated by the user. The display device 104 can connect to a content server 110 or an activation server 116 using a Wi-Fi/Ethernet network connection (e.g., an internet connection) 108, over a wired or wireless connection.

The display device 104 can send an activation notification to the activation server 116 to indicate an attempt to activate a tuner. The attempt can include an indication received at the receiver 106. In another example, the attempt to activate the tuner can include an input received through an on screen display/user interface 118 (e.g., a touch screen, a pointer device, etc.). The on screen display/user interface 118 can include a menu with selections including an option to access a channel, auto-scan for channels, or change to other inputs. Selections can be made using the on screen display/user interface 118 with the remote 112, the mobile device 114, a pointer device, a touch from a user on the screen of the display device 104, or the like. In another example, the attempt can be in response to the antenna 102 receiving a signal. In yet another example, the attempt can be in response to a confirmation that a signal received by the antenna 102 can be decoded, such as by confirming that the signal strength (e.g., signal amplitude) exceeds a threshold, or the like. In other examples, sending the activation notification can initiate a tuner.

In response to receiving the activation notification, the activation server 116 can relay the information to other servers, such as sending an indication to a third party server that a license is required, will be used, or will be paid. In an example, the activation server 116 can authorize payment of a license fee in response to receiving the activation notification. In another example, the activation server 116 can determine, based on the activation notification, what licenses, if any need be paid for using the tuner. The activation server 116 can send an indication back to the display device 104 indicating that a license has been paid (or payment is pending) and that the tuner can be activated. The display device 104 can activate the tuner in response to receiving the indication back from the activation server 116. The activation server 116 can track usage or activation of a tuner or a codec and can pay a license fee or forward an invoice for a license fee at a later time. In another example, the activation server 116 can pre-purchase or store already purchased licenses for tuners or codecs and can keep track of activations in a database. In yet another example, the activation server 116 can aggregate tuner or codec activations and pay or invoice in bulk at a later time.

In another example, the activation server 116 can provide an indication on the display device 104 that a license fee must be paid to access the tuner or a codec. In this example, a user can select to use the tuner or a codec on the on screen display/user interface 118 or via the receiver 106 and agree to pay the license fee. The license fee can optionally be paid later, such as by adding it to a subscription bill (e.g., phone bill, cable bill, satellite bill, DVR bill, etc.) or can be paid immediately, such as by credit card, bank withdrawal, gift card, online account, etc.

The display device 104 can include a television, a smart television, an internet-connected television, a monitor, or the like. In an example where the display device 104 cannot access the internet (e.g., cannot access the activation server 116), a tuner or codec can be deactivated. If the display device 104 cannot access the internet (e.g., the display device 104 does not include circuitry to connect to the internet or the display device 104 is temporarily disconnected), the tuner or codec can be activated using a confirmation code, such as one obtained by a user over the phone, on a website, on another internet-connected device, or through the mail. In another example, the tuner or codec can be disabled or deactivated until an internet connection is established by the display device 104 or an indication of successful activation is received via the internet connection.

The system 100 can include the content server 110. The content server 110 can transmit information to the display device 104 via the wireless/wired (Wi-Fi/Ethernet) network connection (e.g., an internet connection) 108, such as an audio or video stream. The content server 110 can be a local server, such as a media server accessed over Wi-Fi, or a remote server, such as a server for a website or a video streaming server. The content delivered to the display device 104 by the content server 110 can be content that must be decoded by a codec or a tuner.

The system 100 can include a media receiver box 120. The media receiver box 120 can include a cable box, a digital video recorder (DVR), a satellite box, a stand-alone tuner box (e.g., digital tuner box), a tuner box with an antenna, or the like. The media receiver box 120 can be physically coupled to the display device 104, such as via a High-Definition Multimedia Interface (HDMI) or Mobile High-Definition Link (MHL) connection, or connected wirelessly. The media receiver box 120 can transmit information to the display device 104, such as an audio/video stream or audio/video content, that can be decoded by a codec or a tuner. In another example, the mobile device 114 can supply the audio or video content. In yet another example, the display device 104 can transmit audio or video to the mobile device 114 or a tablet or other device, such as using Wi-Fi direct (e.g., casting to a device from the display device 104).

In an example, the system 100 can include a deactivated tuner on the display device 104. In this example, a rebate can be offered for a user that does not activate or disables the tuner. For example, the tuner can be permanently disabled (e.g., a component of the tuner can be physically decoupled or destroyed). In another example, the display device 104 does not include a tuner and a user can receive a rebate for not having a tuner installed in the display device 104. In this example, the display device 104 can be offered for sale with a tuner stick or other external tuner device. A user can receive a rebate for not using the tuner stick, such as by receiving the tuner stick and then returning it at a point of sale or later returning the tuner stick unused. In yet another example, the display device 104 can include a monitor and a tuner stick can be offered for sale with the monitor.

The display device 104 can include a store or retail mode. In the store or retail mode, a tuner or codec can be activated without a tuner or codec activation notification being sent out to a server. The store or retail mode can be activated using a key, a geographic location, specific hardware coupled to the display device 104, or the like. When the display device 104 is in the store or retail mode, all tuners and codecs on the display device 104 can be activated without sending an activation notification or obtaining a license or can receive a special license. In an example, the store or retail mode can be deactivated for the display device 104 and any tuner or codec previously activated can be deactivated. Then the display device 104 can require a license or activation notification to reactivate a tuner or codec, such as in a home mode. In another example, the store or retail mode can last for a predetermined amount of time. In yet another example, the store or retail mode can be activated once but then not reactivated again unless a license or activation notification is obtained or sent.

Figure 2:
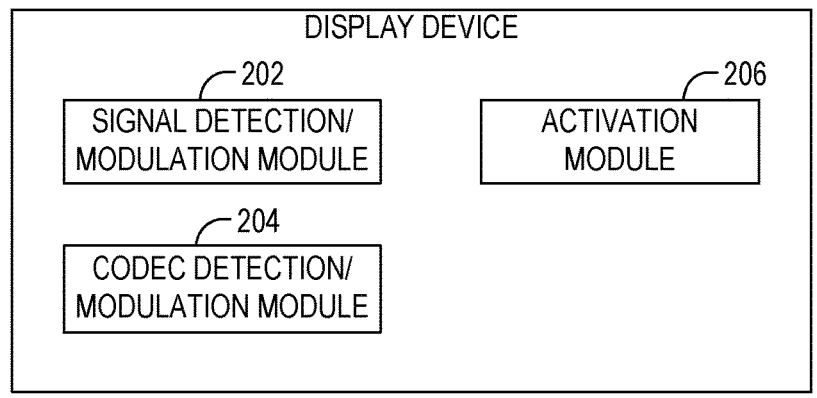
FIG. 2 illustrates a display device for determining whether a signal can be decoded by a tuner or codec in connection with an example further described herein.

FIG. 2 illustrates a display device 200 for determining whether a signal can be decoded by a tuner or codec. The display device 200 can include a signal detection/modulation module 202, a codec detection/modulation module 204, or an activation module 206. Any one or combination of these modules can be used by the display device 200 to determine if a signal received (e.g., from an antenna, a network, a cable, etc.) can be decoded by a tuner or codec. In an example, the signal detection/modulation module 202 can determine if a signal received through an antenna at a tuner is sufficiently strong enough to exceed a threshold signal strength. The signal detection/modulation module 202 can interpret a signal by using a sample or multiple samples over an interval, or by taking an average signal strength over an interval.

For example, while an initial signal may have a high signal strength, the strength may decay over time so that by the end of an interval, the signal strength is below a minimum threshold. The interval can include a few seconds or a few minutes. In another example, the signal detection/modulation module 202 can repeat the interpretation over the interval according to a schedule. For example, the schedule can include a test once a month, or every few months, once a week or every few weeks, over a predetermined period of time over the lifespan of the display device 200 or a tuner, etc., to determine whether to activate or deactivate the tuner. The tuner can be activated automatically if a signal is detected or exceeds a threshold, or can require a user input in addition to the signal detection or the signal exceeding the threshold. The tuner can be deactivated automatically to save power if the tuner is not in use or the signal is not detected or the signal does not exceed the threshold. In an example, the signal detection/modulation module 202 can indicate that the signal has insufficient strength and the tuner can remain inactive. In another example, the signal detection/modulation module 202 can determine that a signal received is of sufficient strength and indicate that the tuner should be activated. Other operations can take place before the tuner is activated, such as sending an indication to a server.

The signal detection/modulation module 202 can also determine that a signal is sufficient to activate the tuner using other tests. For example, the signal detection/modulation module 202 can test the signal for whether a signal-to-noise ratio of the signal exceeds a threshold. In another example, the signal detection/modulation module 202 can determine whether the signal is unencrypted or capable of being decrypted or whether the signal includes a particular transport stream (e.g., a Moving Picture Experts Group (MPEG) transport stream (MPEG-TS or MPEG-2 transport stream)).

The codec detection/modulation module 204 can determine if a signal, such as a video feed, is encoded with a particular codec. If the codec detection/modulation module 204 determines that a signal is encoded with a codec, the codec detection/modulation module 204 can decode the signal. The codec detection/modulation module 204 can send an indication that a codec will be used, that a codec is being used, or that a codec was used. The codec detection/modulation module 204 can specify the particular codec used to decode the signal and output decoded video. The signal detection/modulation module 202 can be used with the codec detection/modulation module 204 if the signal received through the tuner is also encoded with a codec. In an example, the codec detection/modulation module 204 can detect an encoded signal, determine the particular codec used, and delay decoding the signal until after sending an indication (and in some examples, receiving a response).

The display device 200 includes an activation module 206 that can be used in conjunction with one or both of the signal detection/modulation module 202 and the codec detection/modulation module 204. The activation module 206 can receive information from the signal detection/modulation module 202 or the codec detection/modulation module 204 and determine if a tuner or codec should be activated. The activation module 206 can communicate with other external devices or servers to determine whether and when to activate a tuner or codec. The activation module 206 can access memory to determine if a tuner or codec has already been activated.

Figure 3:
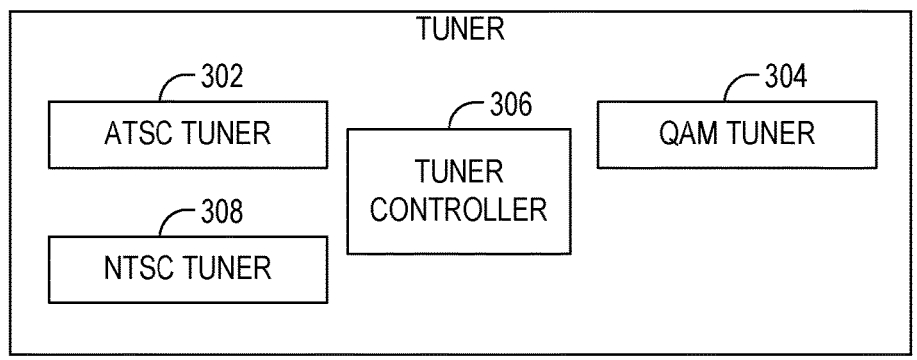
FIG. 3 illustrates a tuner to receive signals and output video in connection with an example further described herein.

FIG. 3 illustrates a tuner 300 to receive signals and output video. The tuner 300 can include one or more types of tuners, such as an ATSC tuner 302, a QAM tuner 304, or an NTSC tuner 308. The tuner 300 can include a tuner controller 306, that can include a processor, memory, or a transceiver or other communication device. The ATSC tuner 302 can be used to decode digital signals received from an antenna, and the antenna can be coupled to the tuner 300. The NTSC tuner 308 can be used to decode analog signals received from an antenna, and the antenna can be coupled to the tuner 300. The ATSC tuner 302 or the NTSC tuner 308 can initially be deactivated, or can be activated for a trial period or sample period before being deactivated. In another example, the tuner 300 can include a QAM tuner 304. The QAM tuner 304 can be used to decode signals received from a cable (e.g., cable television). In yet another example, the tuner 300 can include a decoder or decoders for a codec or codecs. The ATSC tuner 302 or the QAM tuner 304 can include a decoder or decoders as well.

In an example, the tuner 300 is deactivated when the tuner 300 is included in a consumer product, such as a display device. In this example, the tuner 300 is deactivated until some later point after the display device is purchased by a consumer and turned on. In an example, the tuner 300 can be activated in response to different indications or situations. For example, the tuner 300 can be activated if an indication is received to scan for available ATSC channels. The tuner 300 can scan for a specific digital channel or auto-scan for all available digital channels (or a portion of available digital channels). In an example, a digital channel can include a digital medium that stores or transports a digital television stream, such as an ATSC channel, an NTSC channel, or a QAM channel. In another example, a channel can include a physical channel, display channel, digital subchannel, virtual channel, logical channel, frequency, frequency band, analog channel, or the like. A user indication including an attempt to access a digital channel can include an attempt to access a single digital channel, such as one of the examples above, a set of digital channels (e.g., a set of digital channels broadcast together over a single ATSC channel frequency band), or a scan to determine available channels.

The tuner 300 can be activated if an indication is received that a license has been paid or will be paid (or in response to a command or confirmation from an activation service that will track the status of the activation of the tuner license). The tuner 300 can be activated if a cable or antenna is plugged into the tuner 300 or the display device. The tuner 300 can be activated if a signal strength exceeds a threshold. The tuner 300 can be activated if a period of time has elapsed where one or more of the conditions above is present for part or all of the period of time (or, as a result of a successful test for the conditions where the test is repeated after an interval of time has elapsed). The tuner 300 can be activated in response to a combination of the above conditions.

The tuner 300 includes the tuner controller 306 that can be used to activate or deactivate the tuner 300. The tuner controller 306 can communicate with a display device or external device. The tuner controller 306 can deactivate the tuner 300 to save power, such as when the tuner 300 is not being actively used (e.g., if another non-tuner signal or connection is detected or activated, such as an HDMI signal or HDMI port, etc.). In an example, the tuner controller 306 can periodically determine whether the tuner 300 can access a signal, such as every few hours, days, or months. In another example, the tuner controller 306 can deactivate the tuner 300 if a signal is lost and cannot be reconnected. In this example, the tuner controller 306 can encrypt software necessary to operate the tuner 300 or can cause circuitry that is necessary to operate the tuner 300 to become physically disabled. If the tuner 300 is inoperable due to encryption or becomes physically disabled, it can require an activation notification to be received from a server to reactivate, for example, upon payment of a license fee, or verification of an available license.

In an example, when a configuration change to a display device is detected, such as when a physical connection to the television is added or removed, the tuner 300 can be activated or deactivated (including placing the tuner in a deactivated state to reduce power consumption). For example, when a HDMI cable connected between the HDMI port of the display device and a cable box provides a display signal, the tuner 300 can be deactivated; when the HDMI cable is unplugged or does not provide a signal, the tuner 300 can be activated to attempt to access a signal via a RF (radio frequency) connection port; likewise, other combinations based on physical connection and de-connection to various input ports of the display device can be performed. In another example, the configuration change can be mechanically detected for an attached or detached cable, or can be detected through a loss or gain of a wireless connection or wireless signal.

Figure 4:
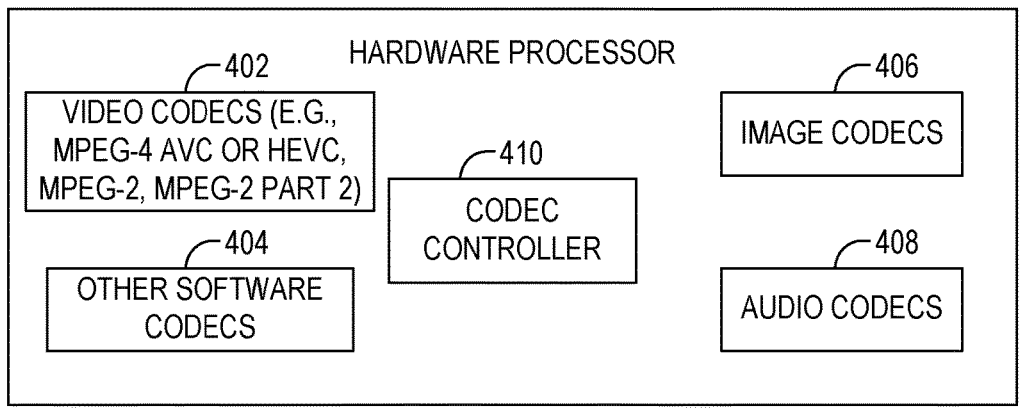
FIG. 4 illustrates a hardware processor to receive signals and output information in connection with an example further described herein.

FIG. 4 illustrates a hardware processor 400 to receive signals and output information (e.g., video, audio, software, images, etc.). The hardware processor 400 can include one or more of video codecs 402, other software codecs 404, image codecs 406, or audio codecs 408. The various codecs 402, 404, 406, and 408, can coexist on the hardware processor 400 in various states of active, inactive, or previously activated. For example, a codec can require a one-time license, and once that license is paid, it does not need to be paid again. In this example, information can be saved to indicate that the license has been paid, and the codec can be in a "previously activated" state if not being used. Other codecs may not require a license, and can be automatically placed in the "previously activated" state to indicate that no license need be paid. Still other codecs can require payment of a license for each use, or for an average amount of use, and can remain in the "inactive" state when not in use even if previously used. The hardware processor 400 includes a codec controller 410, that can include a processor, memory, and communication components to control, store, and communicate codec state information. In an example, video codecs 402 can include MPEG-4 AVC, MPEG-4 HEVC, MPEG-2, MPEG-2 Part 2, or like codec formats.

Figure 5:
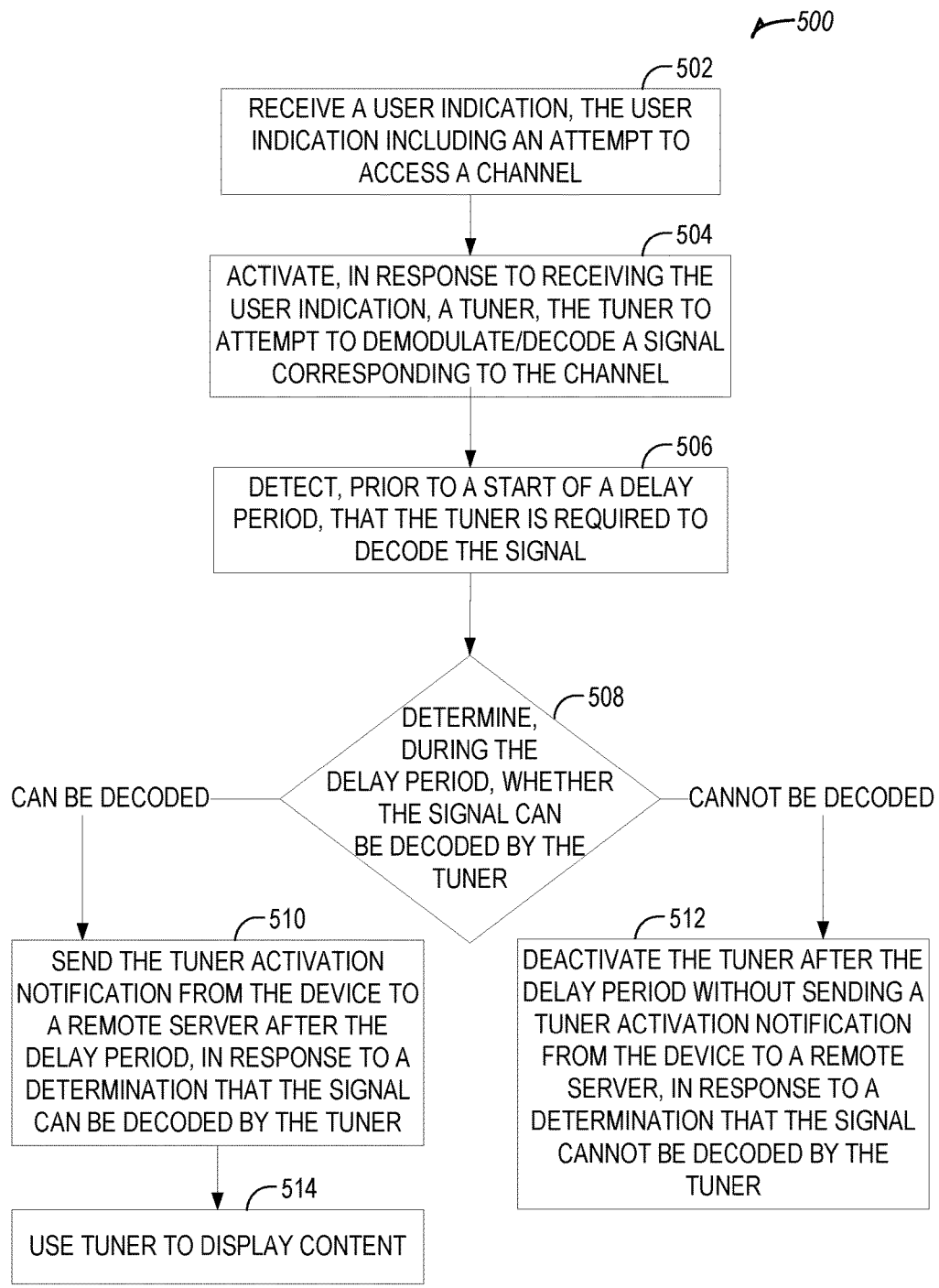
FIG. 5 provides an illustration of a flowchart of a technique to determine whether to send an activation notification based on whether a signal can be decoded by a tuner in connection with an example further described herein.

FIG. 5 provides an illustration of a flowchart 500 of a technique to determine whether to send an activation notification based on whether a signal can be decoded by a tuner. The technique can include an operation 502 to receive a user indication, the user indication including an attempt to access a digital channel. The technique can include an operation 504 to activate, in response to receiving the user indication, a tuner, the tuner to attempt to demodulate/decode a signal corresponding to the digital channel. In an example, operation 504 can include temporarily, momentarily, or conditionally activating the tuner. Momentarily activating the tuner can include an automatic timer to deactivate the tuner, or can include deactivating the tuner if the tuner cannot decode the signal or the signal cannot be detected. In another example, the technique can include never activating the tuner if a signal corresponding to the digital channel cannot be detected.

The technique can include an operation 506 to detect, prior to a start of a delay period, that the tuner is required to decode the signal. The technique can include a decision operation 508 to determine, during the delay period, whether the signal can be decoded by the tuner. If the signal can be decoded, the technique can include an operation 510 to send a tuner activation notification to a remote server after the delay period, in response to a determination that the signal can be decoded by the tuner. After the tuner activation notification is sent, an operation 514 can include using the tuner to display content. Additional operations can occur in the time period between sending the tuner activation notification and using the tuner to display content, such as receiving confirmation of the sent notification, receiving authorization to activate the tuner, paying a license fee, asking a user to pay or confirm payment of a license fee, asking a user to enter a confirmation code, etc. If the signal cannot be decoded, the technique can include an operation 512 to deactivate the tuner after the delay period without sending the tuner activation notification to the remote server, in response to a determination that the signal cannot be decoded by the tuner.

Figure 6:
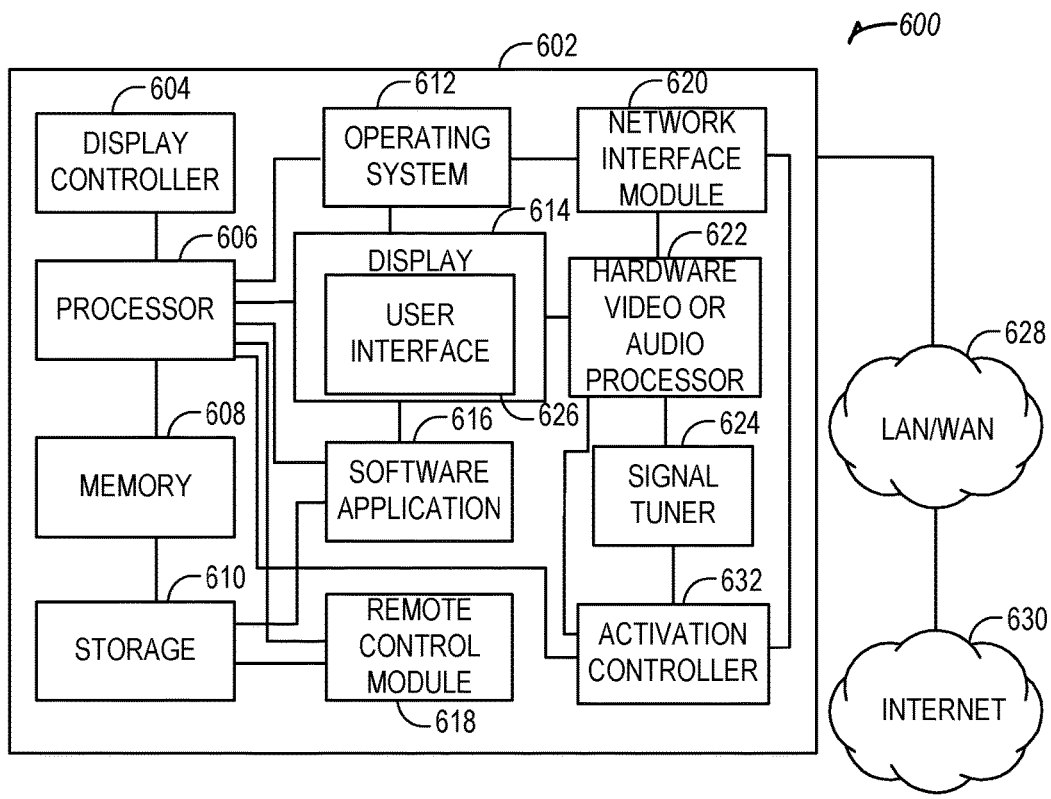
FIG. 6 illustrates a configuration of an electronic display device in connection with an example further described herein.

FIG. 6 provides an illustration of a block diagram 600 for an example architecture for operation with a display device 602, configured for implementing the example techniques described herein. In some examples, the display device 602 may include a display 614 such as a liquid crystal display (LCD), light-emitting diode (LED) display, organic light-emitting diode (OLED) display, cathode ray tube display, plasma display panel, or digital light processing (DLP) display, to directly provide an audiovisual output. The display 614 may include a user interface 626. In some examples, the display device 602 may include functionality to directly receive user input with use of the display 614, such as with use of a touch screen input mechanism, or the display device 602 may receive user input in connection with other input processing components such as a video camera and video processing system configured to perform gesture-based detection and movement.

As shown, the display device 602 is coupled to one or more of audiovisual content sources, accessed through an analog processing component such as a signal tuner 624, a digital video processing component, or a digital audio processing component. The display device 602 may also receive content using a network interface module 620, to establish a connection to receive content from the internet 630 via a local area network (LAN) or wide area network (WAN) connection 628. The signal tuner 624 may also optionally receive content using the network interface module 620, to establish a connection to receive content from the internet 630 via the LAN or WAN connection 628. The network interface module 620 may include or may connect to a LAN connector such as an Ethernet connector. The signal tuner 624 may be activated in response to receiving a user indication, an initialization, or an indication from the software application(s) 616, the operating system 612, the remote control module 618, the network interface module 620, a hardware video or audio processor 622, the processor 606, or the user interface 626 on the display 614. The signal tuner 624 may be used to decode a signal corresponding to a channel, scan a RF signal for a channel, or the like. The hardware video or audio processor 622 may be used to implement a codec to decode a signal similar to how the signal tuner 624 may decode a signal. The hardware video or audio processor 622 may be activated in response to receiving a user indication and the hardware video or audio processor 622 may attempt to decode or may decode a signal corresponding to a video using a codec. The hardware video or audio processor 622 may be configured to implement a codec or multiple codecs in series or parallel. The hardware video or audio processor 622 implementing a codec may be deactivated without deactivating the hardware video or audio processor 622 for other codecs or for other uses of the hardware video or audio processor 622.

The display device 602 is further configured to receive user input and interaction with a remote or other user input control via infrared (IR), radio frequency (RF), Wi-Fi, or similar wireless communication using the remote control module 618 and provide control of device operations through use of the processor 606. In an example, the remote control module 618 may communicate with a remote control device, such as a controller or a mobile device (e.g., a mobile phone). The remote control device may include a transceiver for transmitting or receiving signals, such as IR, RF, Bluetooth, or Wi-Fi commands. The remote control device may also include a processor and buttons, a user interface, a display device, or the like for receiving commands from a user.

The operations of the display device 602 may be implemented through use of a display controller 604, processor 606, memory 608, and storage component 610. The processor 606 may be operably coupled to the display controller 604, the memory 608, and the storage component 610, to facilitate operations of an operating system 612, user interface 626 on display 614, and one or more software application(s) 616. For example, instructions for execution of the user interface 626 and the software application(s) 616 may be provided in the storage component 610, loaded into the memory 608, and executed by the processor 606.

The operating system 612 may provide various functions and features to facilitate operation of the user interface 626 and the various software application(s) 616, including the interface and applications to implement the input selection mechanisms and on-screen display configurations described herein. The operating system 612, user interface 626, and software application(s) 616 may be configured for upgrading through either a local connection and commands (e.g., a universal serial bus (USB) port) or a remote connection and commands (e.g., an internet service) to obtain and deploy upgraded software.

The display device 602 may include an activation controller 632. The activation controller 632 can be operatively coupled to the processor, the hardware video or audio processor 622, and the signal tuner 624. The activation controller 632 can control activation of the hardware video or audio processor 622 or the signal tuner 624. The activation controller 632 can include circuitry to control the signal detection/modulation module 202, the codec detection/modulation module 204, or the activation module 206 of FIG. 2. In an example, the activation controller 632 can connect with the network interface module 620 to send and receive activation notifications to a server. The activation notifications can include tuner or codec activation indications. The activation controller 632 can control activation of the signal tuner 624 or a codec to run on the hardware video or audio processor 622 after sending or receiving an activation notifications through the network interface module 620.

Embodiments of the techniques and configurations may be implemented within a variety of systems and display devices, including televisions, monitors, projectors, and other video display screens, in addition to display devices without a screen or other direct video output. Other devices that provide a line-out or stream audiovisual signals may also be used in connection with the user interface described herein. As used herein, audio visual content refers to content including both audio and visual characteristics, as well as content providing exclusively audio characteristics or exclusively visual characteristics.

Embodiments may be implemented in connection with wired and wireless networks, across a variety of digital and mediums. Although some of the previously described techniques and configurations were provided with reference to implementations of consumer electronic devices with wired or physically coupled digital signal connections, these techniques and configurations may also be applicable to display of content from wireless digital sources from a variety of local area wireless multimedia networks and network content accesses using WLANs, WWANs, and wireless communication standards. Further, the previously described techniques and configurations are not limited to input sources provided from a direct analog or digital signal, but may be applied used with any number of multimedia streaming applications and protocols to provide display content over an input link.

Embodiments may be implemented in one or a combination of hardware, firmware, and software. Embodiments may also be implemented as instructions stored on a non-transitory machine-readable storage device or medium, which may be read and executed by at least one processor to perform the operations described herein. A machine-readable storage device or medium may include any non-transitory mechanism for storing information in a form readable by a machine (e.g., a computer or other processor-driven display device). For example, a machine-readable storage device or medium may include read-only memory (ROM), random-access memory (RAM), magnetic disk storage media, optical storage media, flash-memory devices, and other storage devices and media. In some embodiments, display devices such as televisions, A/V receivers, set-top boxes, and media players may include one or more processors and may be configured with instructions stored on such machine-readable storage devices or mediums.

Figure 7:
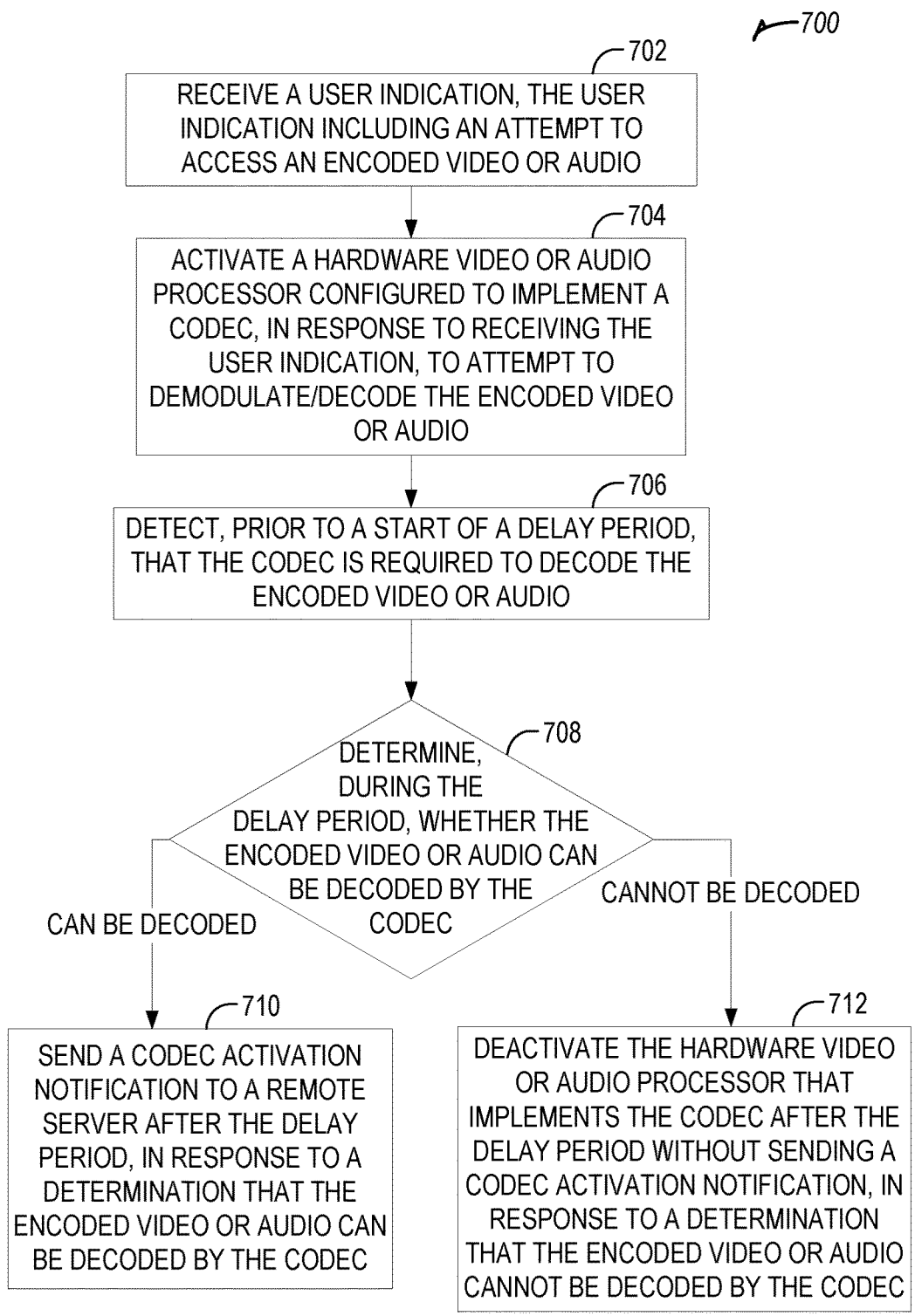
FIG. 7 provides an illustration of a flowchart of a technique to determine whether to send an activation notification based on whether a signal can be decoded by a codec implemented on a hardware video or audio processor in connection with an example further described herein.

FIG. 7 provides an illustration of a flowchart 700 of a technique to determine whether to send an activation notification based on whether a signal can be decoded by a codec implemented on a hardware video or audio processor. The technique can include an operation 702 to receive a user indication, the user indication including an attempt to access an encoded video or audio. The technique can include an operation 704 to activate a hardware video or audio processor configured to implement a codec, in response to receiving the user indication, to attempt to demodulate/decode the encoded video or audio. For example, this user indication may occur as a result of a user command to access a certain application, input port, or media content, or changed electronic (or electromechanical) operations or conditions in the display device related to the use of the certain application, input port, or media content.

The technique can include an operation 706 to detect, prior to a start of a delay period, that the codec is required to decode the encoded video or audio. The technique can include a decision operation 708 to determine, during the delay period, whether the encoded video or audio can be decoded by the codec. If the encoded video or audio can be decoded, the technique can include an operation 710 to send a codec activation notification to a remote server after the delay period, in response to a determination that the encoded video or audio can be decoded by the codec. If the encoded video or audio cannot be decoded, the technique can include an operation 712 to deactivate the hardware video or audio processor that implements the codec after the delay period without sending a codec activation notification to the remote server, in response to a determination that the encoded video or audio cannot be decoded by the codec.

In an example, a codec can include a video codec, audio codec, broadcast codec, software codec, image codec, or the like. Examples of codecs include MPEG-1, MPEG-2, MPEG-2 Part 2, MPEG-4, MPEG-4 Part 2, MP3, advanced audio coding (AAC), code division multiple access (CDMA), linear pulse code modulation (LPCM), Apple lossless audio codec (ALAC), DTS-HD master audio (e.g., HD DVD or Blu-ray), Windows media audio (WMA), Windows media video (WMV), high efficiency video coding (HEVC), joint photographic experts group (JPEG), other ITU standard video or audio codecs, other lossless or lossy codecs, or the like. In another example, a codec can include a high-definition (HD) or ultra high-definition (UHD) codec.

Figure 8:
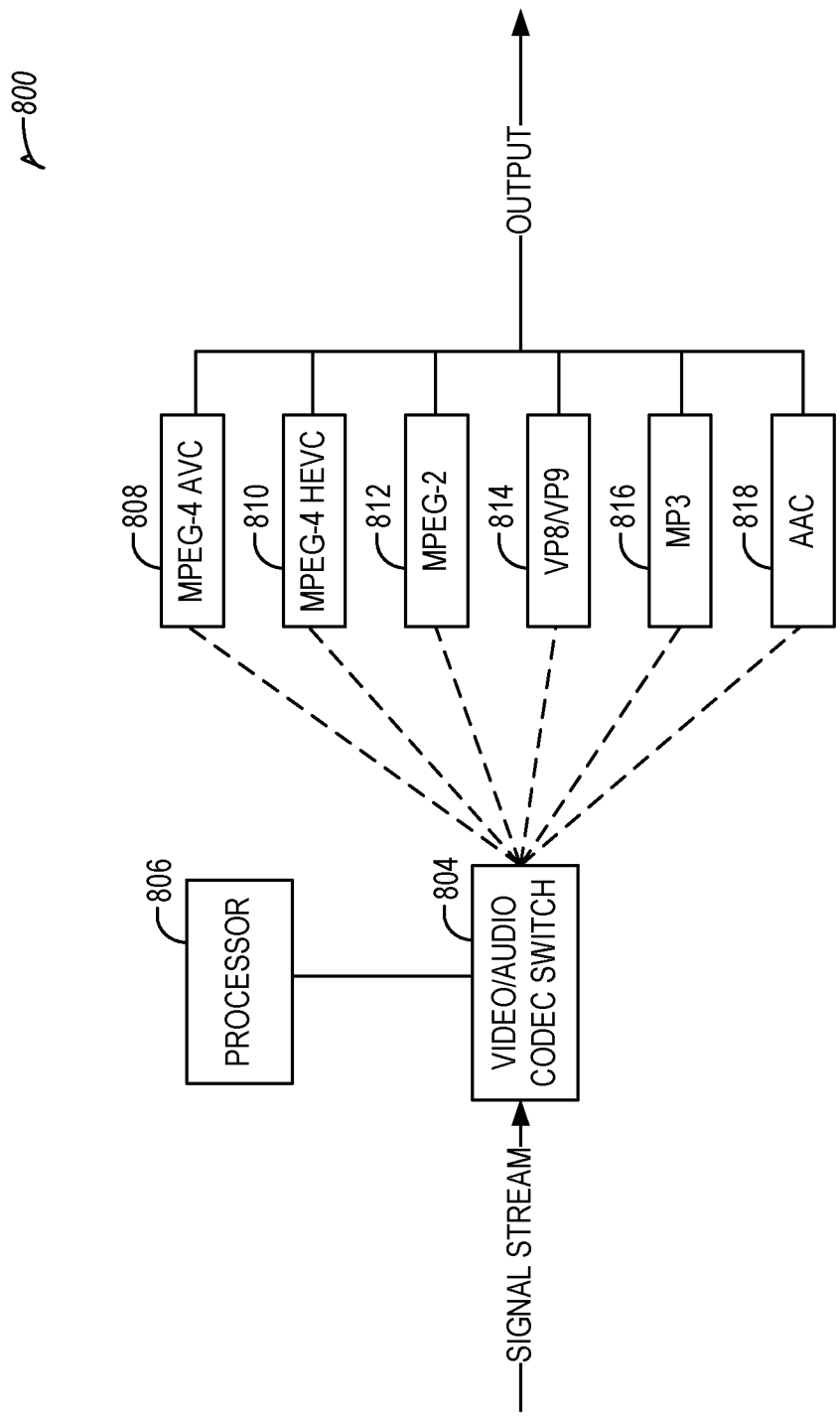
FIG. 8 illustrates a system for selecting and activating codecs in connection with an example further described herein.

FIG. 8 illustrates a system 800 for selecting and activating codecs. The system includes a signal stream, such as a signal from an antenna, tuner, cable box, media box, satellite box, device via HDMI or MHL port, device via a coaxial connection, device via an audio/video connector, signal received via a network or the internet, or the like. In system 800, the signal stream is received by a video/audio codec switch 804 that is controlled by a processor 806. In an example, the system 800 is included in a display that includes various codecs (e.g., codecs 808-818). The display can include physically printed circuitry to implement the codecs. In an example, the physically printed codec circuitry is inaccessible by the display without first activating the codecs, such as using one of the methods described above. In another example, the display can include various codecs programmed and stored in memory that can be similarly inaccessible without first activating the codecs.

The video/audio codec switch 804 can include physical or virtual switches to the various codecs that can be connected or disconnected as controlled by the processor 806. In an example, the processor 806 can direct the video/audio codec switch 804 to connect a switch to one or more codecs to demodulate/decode the signal stream. The switch can include a physical switch or a software implemented switch to allow a codec to decode the signal stream. After the signal stream is decoded using one or more codecs (e.g., codecs 808-818) selected by the processor 806 and connected using the video/audio codec switch 804, a new video or audio stream is output, such as to a display device. In an example, the processor 806 can select a single video codec, such as MPEG-4 AVC 808, MPEG-4 HEVC 810, MPEG-2 812, VP8/VP9 814, or the like, a single audio codec, such as MP3 816, AAC 818, or the like, an audio codec and a video codec, or a combination of audio or video codecs.

The processor 806 can select codecs based on an active application, geographic location of a device the system 800 is run on, or by detecting a codec necessary to decode the signal stream. For example, the processor 806 can activate a codec upon initialization of an application, activation of an application, or at a later point after activation of an application, such as upon a user login to an application, or upon verification of user credentials. In another example, the geographic location of a device can require different versions of a codec, make using a codec legal or illegal, or make using a codec require a different license (e.g., cost more or less to activate a license). In this example, the processor 806 can determine if a codec can be switched on based on the geographic location of the device the system 800 is run on. In yet another example, the processor 806 can detect a necessary codec to decode the signal stream and direct the video/audio codec switch 804 to switch on the codec.

VARIOUS NOTES & EXAMPLES

Additional examples of the presently described method, system, and device embodiments are suggested according to the structures and techniques described herein. Other non-limiting examples may be configured to operate separately, or may be combined in any permutation or combination with any one or more of the other examples provided above or throughout the present disclosure.

Example 1 includes subject matter (such as a device, apparatus, or machine) comprising: a user input receiver to receive a user indication, the user indication including an attempt to access a digital channel; a tuner, activated in response to receiving the user indication, to attempt to decode a signal corresponding to the digital channel; a processor to execute instructions that: detect, prior to a start of a delay period, that the tuner is required to decode the signal; determine, during the delay period, whether the signal can be decoded by the tuner; deactivate the tuner after the delay period without sending a tuner activation notification from the device to a remote server, in response to a determination that the signal cannot be decoded by the tuner; and send the tuner activation notification from the device to the remote server after the delay period, in response to a determination that the signal can be decoded by the tuner.

In Example 2, the subject matter of Example 1 may include, wherein the signal includes an Advanced Television Systems Committee (ATSC) signal and the tuner includes an ATSC tuner.

In Example 3, the subject matter of any one of Examples 1 to 2 may include, wherein the channel corresponds to an over-the-air broadcast channel frequency band or subchannel.

In Example 4, the subject matter of any one of Examples 1 to 3 may include, wherein the tuner activation notification includes an indication to indicate usage of the tuner for payment of a license fee corresponding to a unique identifier of the tuner.

In Example 5, the subject matter of any one of Examples 1 to 4 may include, wherein to determine that the signal cannot be decoded by the tuner, the processor executes instructions that determine that an input to the tuner includes a signal-to-noise ratio that is below a threshold.

In Example 6, the subject matter of any one of Examples 1 to 5 may include, wherein to determine that the signal cannot be decoded by the tuner, the processor executes instructions that determine that an input to the tuner includes an amplitude that is below a threshold.

In Example 7, the subject matter of any one of Examples 1 to 6 may include, wherein the signal includes a Quadrature Amplitude Modulation (QAM) signal and the tuner includes a QAM tuner.

Example 8 includes subject matter (such as a device, apparatus, or machine) comprising: a receiver to receive a user indication, the user indication including an attempt to access an encoded video; a hardware video processor that implements a codec, the hardware video processor activated in response to receiving the user indication, to attempt to decode the encoded video; a processor to execute instructions that: detect, prior to a start of a delay period, that the codec is required to decode the encoded video; determine, during the delay period, whether the encoded video can be decoded by the codec; deactivate the hardware video processor that implements the codec after the delay period without sending a codec activation notification, in response to a determination that the encoded video cannot be decoded by the codec; and send the codec activation notification to a remote server after the delay period, in response to a determination that the encoded video can be decoded by the codec.

In Example 9, the subject matter of Example 8 may include, wherein the encoded video is provided in a format according to a Moving Picture Experts Group-4 Advanced Video Coding (MPEG-4 AVC) or a High Efficiency Video Coding (HEVC) standard.

In Example 10, the subject matter of any one of Examples 8 to 9 may include, wherein the codec activation notification includes an indication to pay a license fee for the particular instance of the codec.

In Example 11, the subject matter of any one of Examples 8 to 10 may include, wherein to determine that the signal cannot be decoded by the codec, the processor executes instructions that determine that an output from the codec includes a signal-to-noise ratio that is below a threshold.

In Example 12, the subject matter of any one of Examples 8 to 11 may include, wherein to determine that the signal cannot be decoded by the codec, the processor executes instructions that determine that an output from the codec includes an amplitude that is below a threshold.

Example 13 includes subject matter (such as a device, apparatus, or machine) comprising: a tuner, activated in response to initialization of the tuner, to decode a radio frequency (RF) signal; a display device, including a user interface, the user interface to display an option to scan the RF signal for a digital channel; a receiver to receive a user indication, the user indication selecting the option to scan the RF signal for the digital channel; a processor to execute instructions that: detect, prior to a start of a delay period, that the tuner is required to decode the digital channel from the RF signal; determine, during the delay period, whether the tuner can decode the digital channel from the RF signal; deactivate the tuner after the delay period without sending a tuner activation notification, in response to a determination that the digital channel cannot be decoded from the RF signal by the tuner; and send the tuner activation notification to a remote server after the delay period, in response to a determination that the digital channel can be decoded from the RF signal by the tuner.

In Example 14, the subject matter of Example 13 may include, wherein the user interface is to prevent display of output from the tuner before sending of the tuner activation notification.

In Example 15, the subject matter of any one of Examples 13 to 14 may include, wherein the system includes a television.

In Example 16, the subject matter of any one of Examples 13 to 15 may include, wherein the tuner activation notification includes an indication to pay a license fee for the particular instance of the tuner.

Example 17 includes subject matter (such as a device, apparatus, machine, method, or machine-readable medium with instructions) comprising operations to: receive a user indication, the user indication including an attempt to access a digital channel; activate, in response to receiving the user indication, a tuner, the tuner to attempt to decode a signal corresponding to the digital channel; detect, prior to a start of a delay period, that the tuner is required to decode the signal; determine, during the delay period, whether the signal can be decoded by the tuner; deactivate the tuner after the delay period without sending a tuner activation notification to a remote server, in response to a determination that the signal cannot be decoded by the tuner; and send the tuner activation notification to the remote server after the delay period, in response to a determination that the signal can be decoded by the tuner.

In Example 18, the subject matter of Example 17 may include, wherein the machine is a television.

In Example 19, the subject matter of any one of Examples 17 to 18 may include, wherein the signal includes an Advanced Television Systems Committee (ATSC) signal and the tuner includes an ATSC tuner.

In Example 20, the subject matter of any one of Examples 17 to 19 may include, wherein the signal includes a Quadrature Amplitude Modulation (QAM) signal and the tuner includes a QAM tuner.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment.

Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A device, comprising:
 a receiver, activated when the device is powered on, to receive a user indication including an attempt to access an encoded video;
 a processor to execute instructions that:
  detect, prior to a start of a verification period, a format of the encoded video;
  activate a codec to an active state from an initial disabled state for the verification period in response to receiving the user indication, wherein, in order to decode the encoded video, the decoding capabilities of the codec are activated for a period of time, and wherein the period of time of the decoding capabilities of the codec expires when the verification period ends;
  determine, during the verification period, whether the format of the encoded video can be decoded by the codec, wherein the codec decodes video provided in a format according to a defined standard;
  automatically place the codec in the disabled state to deactivate the decoding capabilities of the codec after the verification period without sending a codec activation notification, in response to a determination that the format of the encoded video cannot be decoded by the codec during the verification period; and
  automatically send the codec activation notification to a remote server after the verification period, in response to a determination that the format of the encoded video can be decoded by the codec, wherein the codec activation notification is transmitted to the remote server and the codec remains in the active state to decode the encoded video in response to receiving an indication back from the remote server.

2. The device of claim 1, wherein the encoded video is provided in a format according to a Moving Picture Experts Group-4 Advanced Video Coding (MPEG-4 AVC) standard.

3. The device of claim 1, wherein the encoded video is provided in a format according to a High Efficiency Video Coding (HEVC) standard.

4. The device of claim 1, wherein the codec activation notification includes an indication to pay a license fee for activation of the codec.

5. The device of claim 1, wherein to determine that the encoded video cannot be decoded by the codec, the processor executes instructions that determine that an output from the codec includes a signal-to-noise ratio that is below a threshold.

6. The device of claim 1, wherein to determine that the encoded video cannot be decoded by the codec, the processor executes instructions that determine that an output from the codec includes an amplitude that is below a threshold.

7. The device of claim 1, wherein the device is included in a television, and wherein the encoded video is provided in a digital television signal conforming to an Advanced Television Systems Committee (ATSC) standard.

8. The device of claim 1, wherein the device includes a hardware video processor and the codec is implemented in the hardware video processor.

9. At least one non-transitory machine readable medium including instructions that are executed by at least one processor to cause the at least one processor to perform operations to:
 detect, prior to a start of a verification period, a format of an encoded video; activate a codec to an active state from an initial disabled state for the verification period, wherein, in order to decode the encoded video, the decoding capabilities of the codec are activated for a period of time, and wherein the period of time of the decoding capabilities of the codec expires when the verification period ends;
 determine, during the verification period, whether the format of the encoded video can be decoded by the codec, wherein the codec decodes video provided in a format according to a defined standard;
 automatically place the codec in the disabled state to deactivate the decoding capabilities of the codec after the verification period without sending a codec activation notification, in response to a determination that the format of the encoded video cannot be decoded by the codec during the verification period; and
 automatically send the codec activation notification to a remote server after the verification period, in response to a determination that the format of the encoded video can be decoded by the codec, wherein the codec activation notification is transmitted to the remote server and the codec remains in the active state to decode the encoded video in response to receiving an indication back from the remote server.

10. The at least one non-transitory machine readable medium of claim 9, wherein the encoded video is provided in a format according to a Moving Picture Experts Group-4 Advanced Video Coding (MPEG-4 AVC) standard or a High Efficiency Video Coding (HEVC) standard.

11. The at least one non-transitory machine readable medium of claim 9, wherein the codec activation notification includes an indication to pay a license fee for activation of the codec.

12. The at least one non-transitory machine readable medium of claim 9, wherein to determine that the encoded video cannot be decoded by the codec, the processor executes instructions that determine that an output from the codec includes a signal-to-noise ratio that is below a threshold.

13. The at least one non-transitory machine readable medium of claim 9, wherein to determine that the encoded video cannot be decoded by the codec, the processor executes instructions that determine that an output from the codec includes an amplitude that is below a threshold.

14. The at least one non-transitory machine readable medium of claim 9, wherein the at least one non-transitory machine readable medium is included in a television, and wherein the encoded video is provided in a digital television signal conforming to an Advanced Television Systems Committee (ATSC) standard.

15. A method performed by a video processing device, the method comprising:
receiving a command requesting access to an encoded video;
detecting, prior to a start of a verification period, a format of the encoded video;
activating a codec to an active state from an initial disabled state for the verification period in response to receiving the user indication, wherein, in order to decode the encoded video, the decoding capabilities of the codec are activated for a period of time, and wherein the period of time of the decoding capabilities of the codec expires when the verification period ends;
determining, during the verification period, whether the format of the encoded video can be decoded by the codec, and wherein the codec decodes video provided in a format according to a defined standard;
automatically placing the codec in the disabled state deactivating the decoding capabilities of the codec after the verification period without sending a codec activation notification, in response to a determination that the format of the encoded video cannot be decoded by the codec during the verification period; and
automatically sending the codec activation notification to a remote server after the verification period, in response to a determination that the format of the encoded video can be decoded by the codec, wherein the codec activation notification is transmitted to the remote server and the codec remains in the active state to decode the encoded video in response to receiving an indication back from the remote server.

16. The method of claim 15, wherein the encoded video is provided in a format according to a Moving Picture Experts Group-4 Advanced Video Coding (MPEG-4 AVC) standard or a High Efficiency Video Coding (HEVC) standard.

17. The method of claim 15, wherein the codec activation notification includes an indication to pay a license fee for the particular instance of the codec.

18. The method of claim 15, wherein to determine that the encoded video cannot be decoded by the codec, it is determined that an output from the codec includes a signal-to-noise ratio that is below a threshold.

19. The method of claim 15, wherein to determine that the encoded video cannot be decoded by the codec, it is determined that an output from the codec includes an amplitude that is below a threshold.

20. The method of claim 15, wherein the codec is implemented in a hardware video processor.

21. The method of claim 15, wherein the video processing device is included in a television, and wherein the encoded video is provided in a digital television signal conforming to an Advanced Television Systems Committee (ATSC) standard.

* * * * *